(12) United States Patent
Tofts et al.

(10) Patent No.: US 11,496,317 B2
(45) Date of Patent: Nov. 8, 2022

(54) SOFTWARE VALIDATION FOR UNTRUSTED COMPUTING SYSTEMS

(71) Applicant: HEWLETT PACKARD ENTERPRISE DEVELOPMENT LP, Houston, TX (US)

(72) Inventors: Chris Tofts, Bristol (GB); Brian Quentin Monahan, Bristol (GB); Adrian John Baldwin, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 793 days.

(21) Appl. No.: 15/756,977

(22) PCT Filed: Jan. 21, 2016

(86) PCT No.: PCT/US2016/014358
§ 371 (c)(1),
(2) Date: Mar. 1, 2018

(87) PCT Pub. No.: WO2017/127089
PCT Pub. Date: Jul. 27, 2017

(65) Prior Publication Data
US 2018/0254906 A1 Sep. 6, 2018

(51) Int. Cl.
*G06F 21/00* (2013.01)
*H04L 29/06* (2006.01)
(Continued)

(52) U.S. Cl.
CPC .......... *H04L 9/3239* (2013.01); *G06F 21/51* (2013.01); *G06F 21/53* (2013.01); *G06F 21/57* (2013.01);
(Continued)

(58) Field of Classification Search
CPC ... H04L 9/3239; G06F 21/57; G06F 2221/033
See application file for complete search history.

(56) References Cited

U.S. PATENT DOCUMENTS

| 7,725,703 B2 | 5/2010 | Hunter et al. |
| 8,190,903 B2 | 5/2012 | Nayak et al. |

(Continued)

FOREIGN PATENT DOCUMENTS

| CN | 101242270 A | 8/2008 |
| CN | 101834860 A | 9/2010 |

(Continued)

OTHER PUBLICATIONS

Butler, K. et al., "Firma: Disk-based Foundations for Trusted Operating Systems," Apr. 20, 2009, http://cise.ufl.edu/~butler/pubs/firma.pdf.

(Continued)

*Primary Examiner* — Philip J Chea
*Assistant Examiner* — Rodman Alexander Mahmoudi
(74) *Attorney, Agent, or Firm* — Dicke, Billig & Czaja, PLLC

(57) ABSTRACT

A method of validating software including maintaining, in a trusted computing system, a copy of at least portions of data of the software, the software comprising data in an untrusted computing system. The method includes, with the trusted computing system, specifying selected data from data included in the copy as hash data, generating an executable file for generating a hash based on the specified hash data, executing the executable file to generate a check hash using the specified selected data from the copy as the hash data, and determining whether the software is valid based, at least in part, on a comparison of the check hash to an access hash generated by execution of the executable file by the untrusted computing system using the specified selected data from the untrusted computing system as the hash data.

20 Claims, 5 Drawing Sheets

(51) Int. Cl.
*H04L 9/32* (2006.01)
*G06F 21/57* (2013.01)
*G06F 21/53* (2013.01)
*G06F 21/64* (2013.01)
*G06F 21/51* (2013.01)

(52) U.S. Cl.
CPC ...... *G06F 21/645* (2013.01); *G06F 2221/033* (2013.01)

(56) References Cited

U.S. PATENT DOCUMENTS

| | | | |
|---|---|---|---|
| 8,856,504 B2 | 10/2014 | Maino et al. | |
| 8,984,610 B2 | 3/2015 | Spiers et al. | |
| 2006/0015746 A1* | 1/2006 | Kusudo | H04N 7/1675 713/187 |
| 2007/0050402 A1* | 3/2007 | Wessel | G11B 27/034 |
| 2008/0214300 A1* | 9/2008 | Williams | G06F 21/125 463/29 |
| 2009/0083730 A1* | 3/2009 | Richardson | G06F 21/10 717/175 |
| 2010/0031012 A1 | 2/2010 | Rotondo et al. | |
| 2012/0254624 A1 | 10/2012 | Malkhasyan et al. | |
| 2013/0036103 A1 | 2/2013 | Lawson et al. | |
| 2013/0111211 A1* | 5/2013 | Winslow | H04L 9/3234 713/171 |
| 2013/0212709 A1 | 8/2013 | Tucker | |
| 2013/0219183 A1 | 8/2013 | Billau et al. | |
| 2014/0025961 A1 | 1/2014 | Mackintosh et al. | |
| 2014/0258736 A1* | 9/2014 | Merchan | G06F 21/62 713/193 |
| 2014/0359765 A1 | 12/2014 | Chen et al. | |
| 2017/0103200 A1* | 4/2017 | Uehara | G06F 21/52 |

FOREIGN PATENT DOCUMENTS

| | | |
|---|---|---|
| CN | 101593259 A | 3/2011 |
| CN | 103905461 A | 7/2014 |
| CN | 104243457 A | 12/2014 |
| CN | 104715183 A | 6/2015 |
| CN | 1991779 A | 7/2017 |
| EP | 1953998 A1 | 6/2008 |
| EP | 2490145 A1 | 8/2012 |

OTHER PUBLICATIONS

Extended European Search Report received in EP Application No. 16886727.3, dated May 22, 2018, 6 pages.

International Search Report and Written Opinion, International Application No. PCT/US2016/014358, dated Oct. 4, 2016, pp. 1-9, KIPO.

Kevin Butler et al., "Firma: Disk-based Foundations for Trusted Operating Systems," Apr. 20, 2009, pp. 1-11, The Pennsylvania State University, University Park, PA, USA.

* cited by examiner

SOFTWARE VALIDATION FOR UNTRUSTED COMPUTING SYSTEMS

BACKGROUND

Software, such as that running within virtual machines (VMs), for example, may be deployed by providers in untrusted computed environments, such as customer or third party computing systems (e.g, customer or third party clouds). In such cases, providers may ensure that the software is secure (has not or will not be interfered with by unauthorized parties). To ensure the validity of software deployed in computing environments not under control of the provider, current security techniques may involve the installation of additional trusted hardware to the underlying computing system, such as a trusted platform module (TPM).

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Providers may deploy software, including that contained within virtual machines (VMs), software containers, or any other type of virtual compute engine, for example, to run on remote devices in untrusted computing environments (i.e. computing systems over which the provider has no control), such as customer or third party remote servers, data centers, or the like. In some cases, the deployed software may include proprietary data and/or processes. In some examples, the software may be deployed as a service to users and/or customers (i.e. software as a service (SaaS)), with each usage involving payment, authentication, or other forms of validation. In some examples, the software may involve proprietary and/or sensitive data, such as a billing system or a secure document exchange system. When deployed in untrusted computing environment, providers of such deployed software need to be sure that the deployed software is secure and hasn't been improperly accessed or tampered with by unauthorized parties.

Currently, software providers attempt to enforce control over deployed software by tying the software to particular hardware and maintaining physical control over the deployment on that hardware. Such hardware may include hardware to enable validation of the software, such as trusted platform modules (TPMs), for example, which employ encryption hardware/techniques to secure communication and verify that the software is valid and not an unauthorized version. However, such techniques and hardware provide, at best, limited flexibility for modifying or adjusting use of the deployed software.

In cloud-computing environments, many applications benefit from greater flexibility in deployment. For example, some software may be deployed and scaled dynamically as virtual machines that can be implemented on a distributed server or set of servers depending on demand. Conventional validation techniques prohibit or greatly reduce the flexibility of such applications.

Figure 1:
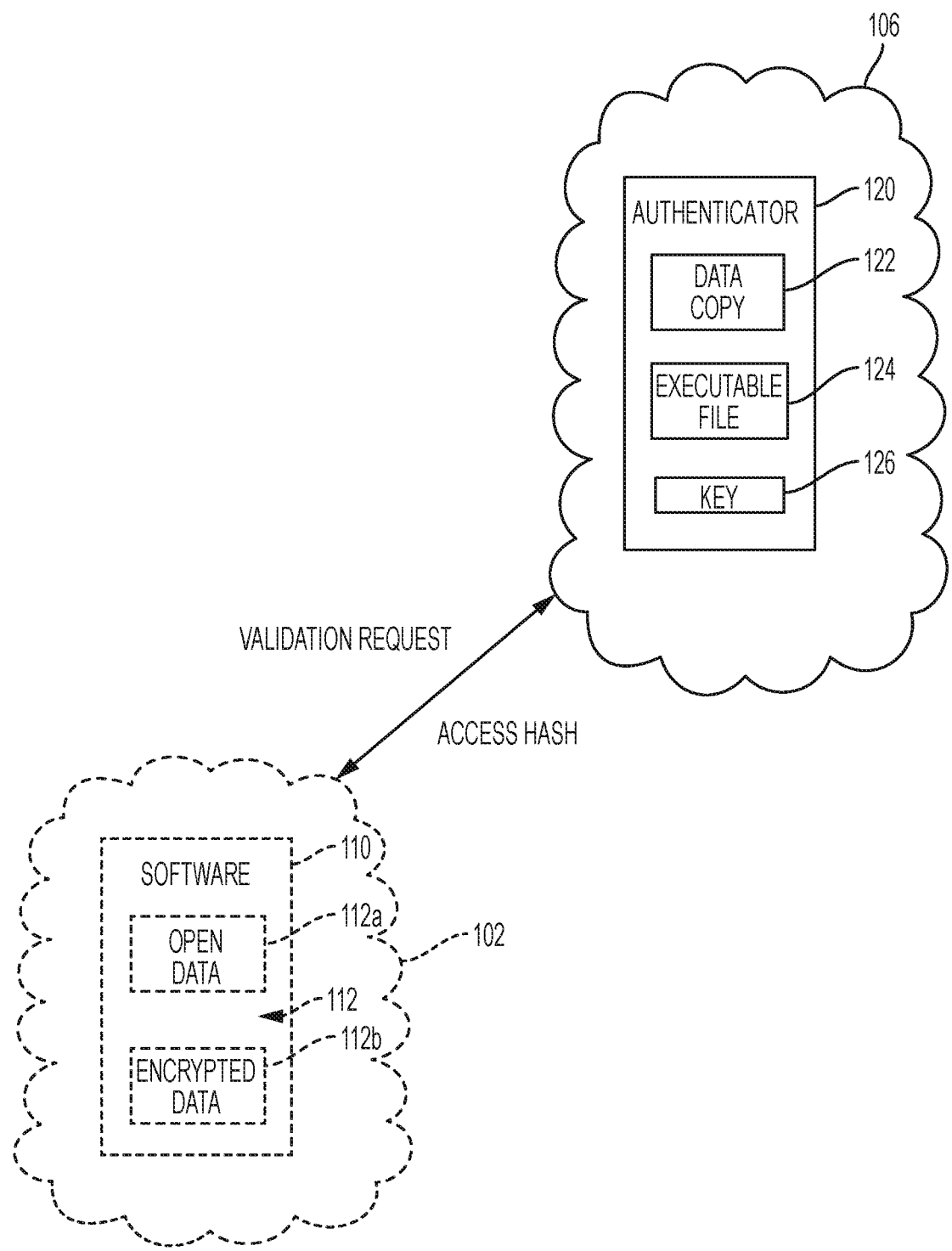
FIG. 1 is a block and schematic diagram generally illustrating a secure software system according to one example.

FIG. 1 is a block and schematic diagram generally illustrating and describing a secure software system 100, in accordance with one example of the present disclosure, which provides validation, from a trusted computing environment, of software in an untrusted computing environment (e.g., a customer or third party cloud) without the use of specialized hardware (e.g., a TPM) and/or without requiring control of the underlying hardware. Secure software system 100 includes an authenticator 120 deployed in a trusted computing system 106 remote from software 110 to be validated in an untrusted computing system 102, software 110 including data 112, including open data 112*a* and encrypted data 112*b*. In one example, authenticator 120 maintains a copy 122 of at least a portion of data 112 of software 110, including at least portions of open data 112*a*.

According to one example, each time a validation request is received from software 110 (e.g. when software 110 is attempted to be accessed), authenticator 120 specifies a selected data string from selected data included in copy 122, generates and provides to software 110 an executable file 124 for generating a hash based, at least in part, on the specified selected data string, and executes executable file 124 to generate a check hash using the specified selected data string. Authenticator receives an access hash generated by execution of executable file 124 by software 110 using the specified selected data string from data 112 from untrusted computing system 102. In one example, authenticator provides software 110 with a key 136 for decrypting encrypted data 112*b* based, at least in part, on whether the check hash matches the access hash.

Figure 2:
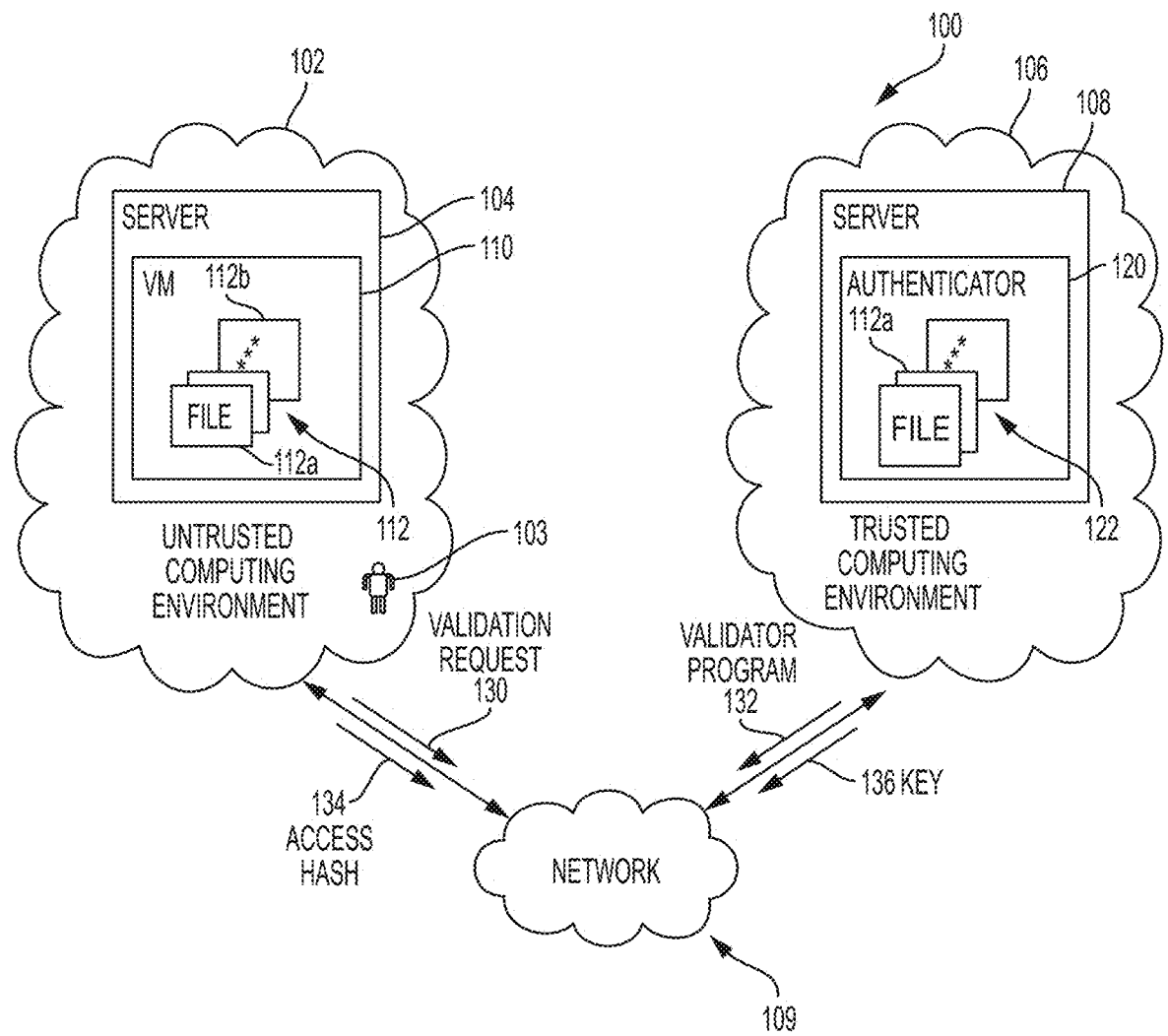
FIG. 2 is block and schematic diagram generally illustrating a secure software system according to one example.

FIG. 2 is a block and schematic diagram illustrating secure software system 110, according to one example. According to the illustrated example, secure software system 100 includes software 110 deployed by a software provider in an untrusted computing environment 102, such as a customer data center or a cloud 102, for example. In one example, software 110 is installed on one or more servers, such as server 104, of customer cloud 102, with software 110 including open data (i.e. unencrypted data) and encrypted data stored in memory thereof, such as illustrated by files 112, including open files 112*a* and encrypted files 112*b*. In one case, software 110 is a virtual machine (VM) 110 (as illustrated), a software container, or any other type of compute engine.

Secure software system 110 further includes an authenticator 120 deployed in a trusted computing environment 106, such as a data center or a cloud 106 of a provider of the software 110. In one example, as illustrated, authenticator 120 is deployed in one or more servers, such as server 108 of provider cloud 106. Authenticator 120 maintains a copy of up to all of the data of VM 110, but maintains a copy of at least the open data, such as illustrated by copy 122 of open files 112a of VM 110. According to one example, as will be described in greater detail below, authenticator 120 maintains a copy of at least data and files for booting and configuring VM 110. In one example, authenticator updates data copy 122 whenever VM 110 is modified/updated by the provider. In one example, at least encrypted data 112b of data 112 is periodically updated and re-encrypted with a new key 136. In one example, encrypted data 112b is updated and re-encrypted with a new key 136 each time VM 110 is booted (sometimes referred to as a "single boot" machine).

In operation, when a user, such as a client 103, accesses VM 110, such as to process billing information, for example, VM 110 boots to an unsecured state based on open data, such as open files 112a, and communicates a validation request 130 to authenticator 120. Untrusted computing system 102 and trusted computing system 106 and, thus, VM 110 and authenticator 120, are in communication via a network 109, such as the Internet. Upon receiving validation request 130, authenticator 120 generates a validator program 132 comprising an executable file for the generation of a hash value (also simply referred to as a "hash"), and communicates the validator program 132 to VM 110.

In one example, validator program 132 includes a plurality of randomized cryptographic challenges for testing the integrity of the data 112 of VM 110 that is difficult for a potential attacker to predict test outcomes in advance. In one example, when generating validator program 132, authenticator 120 selects a hash function (such as one of a SHA-2 family (Secure Hash Algorithm) and SHA-3 family hash function, for example) for generating a hash, and specifies input or hash data to be input into the selected hash function for generation of a hash. In one example, authenticator 120 specifies a data string from selected data included in the copy 122 of data of software 110 (e.g. VM 110) as hash data. In one example, authenticator 120 specifies a series of files from selected files included in copy 122 as hash data. In one example, as will be described in greater detail below, the selected data/files at least include data required for booting and configuring VM 110. In one example, specifying a data string from selected data includes randomly selecting and/or pseudo-randomly selecting data (e.g., files, series of files, etc.) from the copy 122.

Upon receiving validator program 132, VM 110 executes the executable file to generate an "access hash value", or access hash, by applying the specified hash data from the data 112 of VM 110 to the hash function of validator program 132. VM 110 then communicates the access hash 134 to authenticator 120.

Authenticator 120 executes validator program 132 to generate a "check hash value", or check hash, by applying the specified hash data from the copy 122 of the data of VM 110 to the hash function of validator program 132. Authenticator 120 compares the check hash generated from the copy 122 of the data of VM 110 by authenticator 120 to the access hash generated by VM 110 from the actual data 112 of VM 110 in untrusted computing environment 102.

A match between the check hash and the access hash indicates that VM 110 is in an expected state or valid state, meaning that VM 110 has not been tampered with and that no unauthorized users/code or unexpected interfaces (e.g. additional network interfaces or USB ports enabled) have been inserted into VM 110. In one example, when the state of VM 110 has been validated (i.e., the check hash matches the access hash), authenticator 120 provides a key 136 to VM 110 for decrypting encrypted data, such as encrypted files 112b, for example. The failure of a match between the check hash and the access hash indicates that the state of VM 110 is invalid, meaning that the security of VM 110 may have been compromised, and the access request by VM 110 is denied (i.e. no decryption key is provided), or the remote machine may be instructed to take actions to render itself unusable in future.

As described above, secure software system 100 provides remote validation, from a trusted computing environment, of software deployed in an untrusted computing environment (e.g., a customer or third party cloud) without the use of specialized hardware (e.g., a TPM) or without requiring control of the underlying hardware. Such validation enables a service provider (e.g. SaaS) to deploy software (e.g. VMs) on customer or third party hardware (i.e. untrusted computing systems) while ensuring the integrity and security of the software. By unpredictably changing the specified hash data each time a validation request is received (e.g. pseudo-randomly selecting different secondary file trees, and pseudo-randomly generating and inserting a salt at different locations within the series of files of the selected secondary file tree), and by requiring an access hash to be provided within a specified time duration, secure software system 100 forces a potential attacker to deploy a typically infeasible amount of resources which exceeds a potential economic value of the targeted VM. Validation of software in accordance with the present disclosure also provides increased flexibility for deployed software, particularly for cloud-computing environments, as the validation system can readily and quickly adapt to dynamic scaling of virtual machines and software applications.

Figure 3:
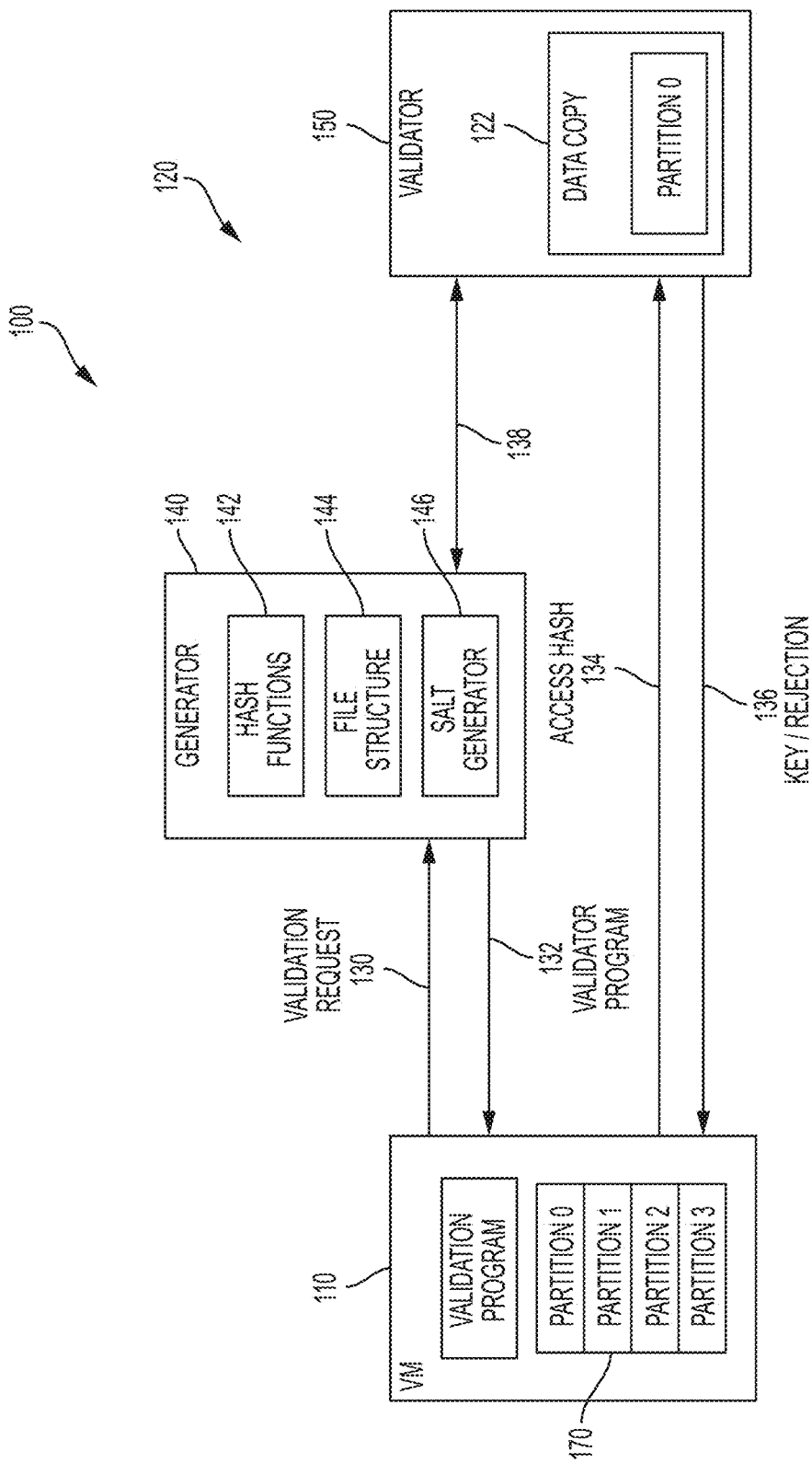
FIG. 3 is a block and schematic diagram illustrating a secure software system according to one example.

FIG. 3 is a block and schematic diagram generally illustrating an example of secure software system 100 in accordance with the present disclosure, where authenticator 120 includes a generator 140 and a validator 150. While generator 140 and validator 150 may be combined, such as described by FIG. 2, separating generator 140 and validator 150, physically and geographically, provides improved defense against DDoS (Distributed Denial of Service) attacks. Any suitable secure data transport technique (e.g. https) may be employed for transporting data between generator 140 and validator 150.

According to the illustrated example, the data files of VM 110 are stored in a plurality of memory partitions 170, such as memory partitions 0 through 3, for instance. In one example, a plurality of partition are "open" partitions (i.e. unencrypted partitions), such as partitions 0 and 1, for instance, and a plurality of partitions are encrypted (i.e., needing a key for decryption/access), such as partitions 2 and 3, for instance.

The files of VM 110 are arranged or structured in tree or directory structures. In one case, files associated with the operating system (OS) and with the boot, configuration, and maintenance of VM 110, for example, are stored in one or more open memory partitions, such as memory partition 0, for instance. For a Linux™ based system, such files are maintained in directories such as "/etc", "/boot", "/bin", and "/usr", to name a few. In a Windows™ based system, such files are maintained in directory paths such as "C:\Program Files\Windows NT", "C:\Program Files (x86)\Windows NT, and configuration registries, among others, for example. In one example, provider IP (intellectual property), such as software applications loaded onto VM 110, and other sensitive data, is stored in one or more encrypted memory partitions, such as memory partitions 2 and 3, for instance.

In operation, when a user, such as customer 103, seeks to utilize VM 110, a validation program 172 on VM 110 generates and sends validation request 130 to generator 140. Similar to that described above, in response to validation request 130, generator 140 of authenticator 120 generates and provides to VM 110 a validator program 132 comprising an executable file for generating a hash from specified hash data.

According to one example, generator 140 maintains a list or table 142 having a plurality of predefined hash functions, such as SHA-2 family and SHA-3 hash functions, for example, suitable for generating a hash based on parameters of secure software system 100. In one example, upon receiving the validation request 130 from VM 110, generator 140 randomly selects one of the predetermined hash functions 142 for validator program 132 to employ for the generation of a hash. In one example, generator 140 varies a length of the hash encryption to provide further variation to the hash generation. In other cases, the hash functions 142 may be functions other than cryptographic hashes, such as non-cryptographic hash functions and Cyclic Redundancy Check (CRC) algorithms, for example.

According to the illustrated example, generator 140 maintains a copy 144 of the directory structure of VM 110 corresponding to the copy 122 of data of VM 110 maintained by validator 150. In one case, based on the copy 144 of the directory structure, generator 140 selects a secondary file or directory path, with the data in the series of files in the selected directory to be used as hash data for the selected hash function.

Figure 4:
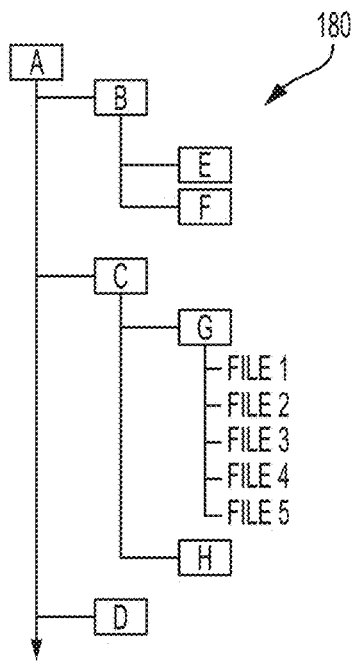
FIG. 4 is a block and schematic generally illustrating an example of a directory structure.

FIG. 4 is a block and schematic diagram generally illustrating an example of a directory structure 180 of VM 100. Directory structure 180 includes a root directory "A", with a plurality of secondary directories B through H branching therefrom. According to one example, when selecting a secondary file of directory path, generator 140 may select file path A-C-G, such that the all of the data of the series of files (Files 1-5) in directory G are specified as hash data for the generation of a hash by the selected hash function of validator program 132.

In one example, as described above, validator 150 maintains a copy of at least the open memory partitions in which files associated with the operating system and with the booting, configuration, and maintenance of VM 110 are stored, such as partition 0, for example. Accordingly, in one example, the file directory "G" of the selected file or directory path A-C-G may correspond to the "\Windows NT$^{TR}$" directory in a Windows$^{TR}$ based system. In other examples, validator 150 may maintain a copy of encrypted memory partitions as well.

In one example, generator 140 provides validator program 132 to VM 110 including the selected hash function from hash function table 142, with the data of the series of files of the selected secondary directory path being specified as input or hash data for the selected hash function, and with a URL (uniform resource locator) address of validator 150.

In one example, in addition to selecting the data of a series of files of a selected directory path as hash data, generator 140 further includes a salt generator 146 to generate a random salt, comprising a random series of characters, for example, which is inserted between a randomly selected pair of files of the series of files. For instance, if the series of files of the selected directory path includes files F1 through F5 (F1-F2-F3-F4-F5), generator 140 may insert the salt between files F3 and F4, for example, such that the specified hash data includes F1-F2-F3-Salt-F4-F5). In such cases, in addition to including in validator program 132 the hash function and the specified directory path, generator 140 further includes the salt "value" (i.e. the character string to insert) and specifies the where the salt is to be inserted in the series of specified files.

Upon generation of validator program 132, generator 140 provides validator program 132 to VM 110 and to validator 150, via path 138. In one example, generator 140 further includes a time stamp in validator program 132 indicative of the time at which validator program was communicated to VM 110.

Upon receiving validator program 132, validation program 172 of VM 110 executes validator program 132 to generate an access hash using data of the series of files of the specified directory path, as stored in memory partitions 170, and the salt included with validator program 132. In one example, validation program 172 of VM 110 communicates the generated access hash, along with the time stamp, to validator 150 using the provided URL address.

Upon receiving validator program 132 from generator 140, validator 150 executes validator program 132 to generate a check hash using the salt included with validator program 132 and the data of the series of files of the specified directory path as stored in the copy 122 of memory partitions 170. In a fashion similar to that described above, validator compares the check hash generated from the data copy 122 to the access hash generated by VM 110 from the actual data 170 of VM 110.

A match between the check hash and the access indicates that VM 110 is in an expected state or valid state, meaning that VM 110 has not been tampered with and that no extra users/code (i.e. unauthorized) has been injected into VM 110. In one example, when the state of VM 110 has been validated (i.e., the check hash matches the access hatch), authenticator 120 provides a key 136 to VM 110 for decrypting encrypted data, such as encrypted partitions 2 and 3, for example. The failure of a match between the check hash and the access hash indicates that the state of VM 110 is invalid, meaning that the security of VM 110 may have been compromised, and the access request by VM 110 is denied (i.e. no decryption key is provided).

In one example, validator 150 further checks the time stamp included in the validator program received from generator 140 against the time at which the access hash was received from VM 110. If the elapsed time between the time stamp and the time at which the access hash was received from VM 110 exceeds a predetermined duration, it is an indication that the security of VM 110 may have been comprised. According to such example, validator 150 provides key 136 to VM 110 when there is a match between the check hash and the access hash, and the elapsed time between the time stamp and the time at which the access hash was received from VM 110 is less than the predetermined duration. If the check hash does not match the access hash, or if the elapsed time between the time stamp and the time at which the access hash was received from VM 110 exceeds the predetermined duration, validator 150 does not provide key 136 to VM 110.

Figure 5:
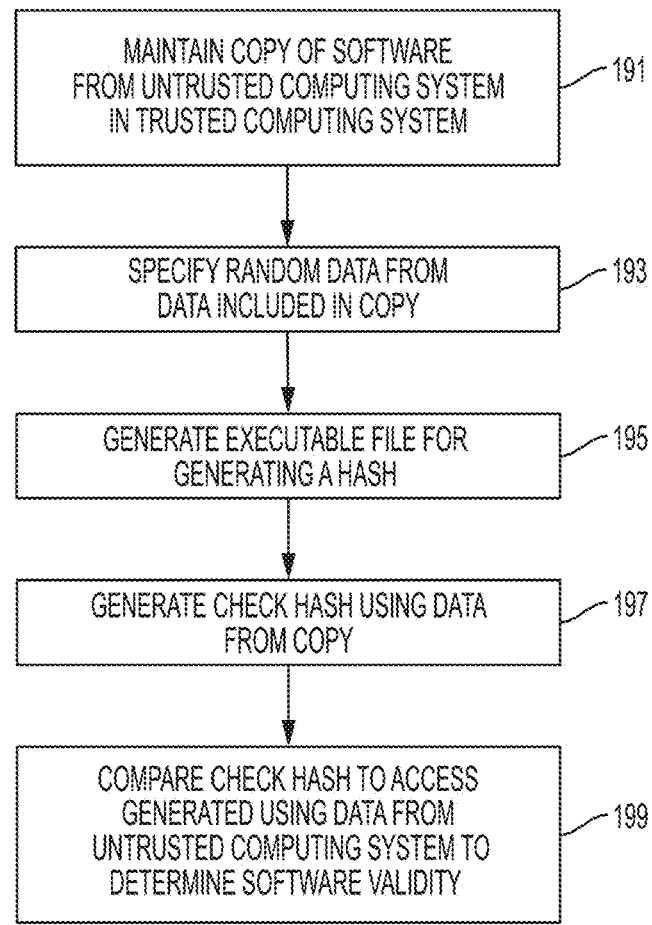
FIG. 5 is a flow diagram illustrating a method of validating software according to one example.

FIG. 5 is a flow diagram illustrating a method 190 of validating software (e.g., a VM, such as VM 110 of FIG. 3) in an untrusted computing system according to one example of the present disclosure. At 191, method 190 includes maintaining, in a trusted computing system, a copy of at least portions of data of the software, the software comprising data in an untrusted computing system, such as validator 150 of authenticator 120 of FIG. 3 maintaining a copy 122 of at least portions of the memory partitions 170 of VM 110.

At 193, the method includes specifying selected data from data included in the copy as hash data, such as generator 140 of authenticator 120 of FIG. 3 specifying as hash data the data from files of a selected directory path included in data copy 122. At 195, method 190 includes generating an executable file for generating a hash based on the specified hash data, such as generator 140 of authenticator 120 of FIG. 3 generating an executable file including randomly selecting predetermined hash functions from a table of hash functions 142.

At 197, method 190 includes executing the executable file with the trusted computing system to generate a check hash using the specified selected data from the copy as the hash data. At 199, method 190 includes determining whether the software is valid based, at least in part, on a comparison of the check hash to an access hash generated by execution of the executable file by the untrusted computing system using the specified selected data from the untrusted computing system as the hash data, such as generator 150 of FIG. 3 comparing a check hash to an access hash generated by VM 110. In one example, the method includes deeming the software as valid if the check hash matches the access hatch, and providing a key to the untrusted computing system for decrypting the encrypted data.

In one example, secure software system 100, including generator 140 and validator 150 of authenticator 120, may be implemented by a computing system. In such examples, each of authenticator 120, generator 140, and validator 150 of the computing system may include any combination of hardware and programming to implement the functionalities of authenticator 120, generator 140, and validator 150, as described herein in relation to any of FIGS. 1-6. For example, programming for authenticator 120, generator 140, and validator 150 may be implemented as processor executable instructions stored on at least one non-transitory machine-readable storage medium and hardware may include at least one processing resource to execute the instructions. According to such examples, the at least one non-transitory machine-readable storage medium stores instructions that, when executed by the at least one processing resource, implement authenticator 120, generator 140, and validator 150.

Figure 6:
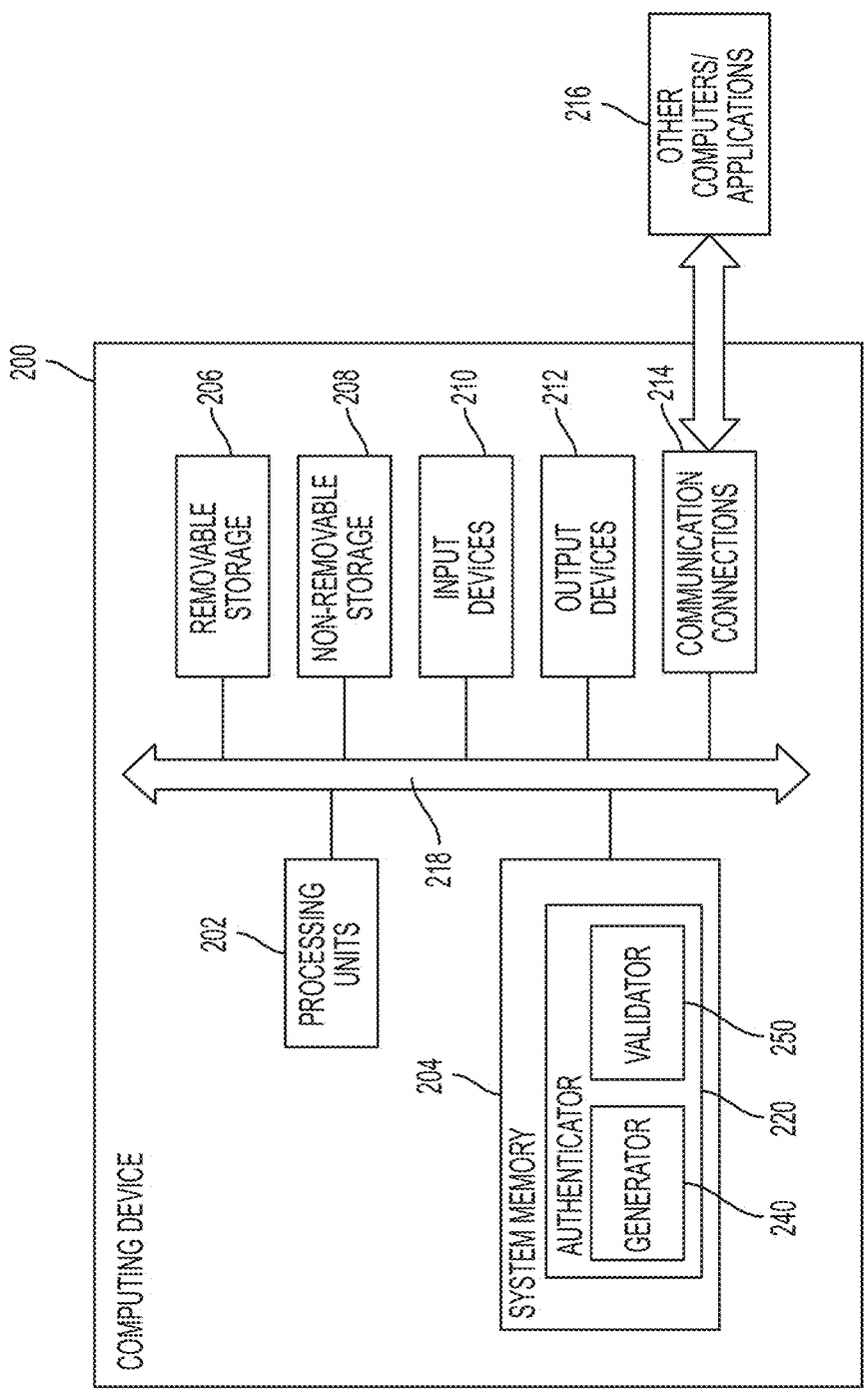
FIG. 6 is a block and schematic diagram generally illustrating a computing system for implementing a secure software system according to one example.

FIG. 6 is a block and schematic diagram generally illustrating a computing system 200 for implementing secure software system 100 according to one example. In the illustrated example, computing system or computing device 200 includes processing units 202 and system memory 204, where system memory 204 may be volatile (e.g. RAM), non-volatile (e.g. ROM, flash memory, etc.), or some combination thereof. Computing device 200 may also have additional features/functionality and additional or different hardware. For example, computing device 200 may include input devices 210 (e.g. keyboard, mouse, etc.), output devices 212 (e.g. display), and communication connections 214 that allow computing device 10 to communicate with other computers/applications 216, wherein the various elements of computing device 200 are communicatively coupled together via communication links 218.

In one example, computing device 200 may include additional storage (removable and/or non-removable) including, but not limited to, magnetic or optical disks or tape. Such additional storage is illustrated in FIG. 4 as removable storage 206 and non-removable storage 208. Computer storage media includes volatile and nonvolatile, removable and non-removable media implemented in any suitable method or technology for non-transitory storage of information such as computer readable instructions, data structures, program modules, or other data, and does not include transitory storage media. Computer storage media includes RAM, ROM, EEPROM, flash memory or other memory technology, CD-ROM, digital versatile disks (DVD) or other optical storage, magnetic cassettes, magnetic tape, and magnetic disc storage or other magnetic storage devices, for example.

System memory 204, removable storage 206, and non-removable storage 208 represent examples of computer storage media, including non-transitory computer readable storage media, storing computer executable instructions that when executed by one or more processors units of processing units 202 causes the one or more processors to perform the functionality of a system, such as secure software system 100. For example, as illustrated by FIG. 6, system memory 204 stores computer executable instructions 220 for authenticator 120 of secure software system 100, including generator instructions 240 and validator instructions 250, that when executed by one or more processing units of processing units 202 implement the functionalities of generator 140 and validator 150 of authenticator 120 of secure software system 100 as described herein. In one example, one or more of the at least one machine-readable medium storing instructions for at least one of authenticator 120, generator 140, and validator 150 may be separate from but accessible to computing device 200. In other examples, hardware and programming may be divided among multiple computing devices.

In some examples, the computer executable instructions can be part of an installation package that, when installed, can be executed by the at least one processing unit to implement the functionality of at least one of authenticator 120, generator 140, and validator 150. In such examples, the machine-readable storage medium may be a portable medium, such as a CD, DVD, or flash drive, for example, or a memory maintained by a server from which the installation package can be downloaded and installed. In other examples, the computer executable instructions may be part of an application, applications, or component already installed on computing device 200, including the processing resource. In such examples, the machine readable storage medium may include memory such as a hard drive, solid state drive, or the like. In other examples, the functionalities of at least one of authenticator 120, generator 140, and validator 150 may be implemented in the form of electronic circuitry.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of validating software performed by a trusted computing system, comprising:
   maintaining, in the trusted computing system, a copy of at least portions of data of the software in an untrusted computing system;
   specifying selected data from data included in the copy as hash data;
   generating an executable file in the trusted computing system, the executable file for generating a hash based on the hash data;

sending the executable file from the trusted computing system to the software in the untrusted computing system;

executing, at the trusted computing system, the executable file to generate a check hash using the selected data as the hash data; and determining whether the software is valid based, at least in part, on a comparison of the check hash to an access hash generated by execution of the executable file by the software in the untrusted computing system using the selected data from the untrusted computing system as the hash data, the access hash received from the software in the untrusted computing system.

2. The method of claim 1, wherein the software maintains open data and encrypted data at the untrusted computing system, the method comprising:

determining that the software is valid responsive to the check hash matching the access hash; and in response to determining that the software is valid, providing a key to the untrusted computing system for decrypting the encrypted data.

3. The method of claim 2, comprising:

providing the key to the untrusted computing system for decrypting the encrypted data responsive to the check hash matching the access hash, and the access hash being generated by the untrusted computing system within a predetermined time duration.

4. The method of claim 1, further comprising:

generating a random salt, wherein the specifying of the selected data comprises specifying insertion of the random salt in the selected data.

5. The method of claim 1, wherein the software maintains open data and encrypted data at the untrusted computing system, and the maintaining of the copy of the at least portions of the data of the software includes maintaining a copy of at the open data.

6. The method of claim 1, wherein the software maintains files in a directory tree structure, each directory in the directory tree structure having a directory path, and wherein the specifying of the selected data as the hash data comprises selecting a directory path of a directory in the directory tree structure, and specifying data of a series of files of the selected directory path as hash data.

7. The method of claim 1, comprising:

updating the copy of the at least portions of the data of the software in response to an update of the software.

8. The method of claim 1, wherein the selected data comprises data associated at least with booting, configuring and maintaining the software.

9. The method of claim 1, wherein the specifying of the selected data comprises one of at least randomly selecting data and pseudo-randomly selecting data from the copy of the at least portions of the data of the software.

10. A secure software system comprising:

a processor; and a non-transitory storage medium storing instructions executable on the processor to:

maintain a copy of at least portions of open data maintained by software in an untrusted computing system;

receive, over a network, a validation request from the software in the untrusted computing system; and in response to the validation request:

specify a selected data string from data included in the copy;

generate an executable file for generating a hash;

send, over the network, the executable file from the secure software system to the software in the untrusted computing system;

execute the executable file to generate a check hash using the selected data string; and provide, over the network, the software with a key for decrypting encrypted data of the software based, at least in part, on whether the check hash matches an access hash generated by execution of the executable file by the software in the untrusted computing system using the selected data string in the open data maintained by the software in the untrusted computing system.

11. The secure software system of claim 10, wherein the instructions are executable on the processor to:

monitor a time duration elapsed for the secure software system to receive the access hash from the software in the untrusted computing system; and deny providing the key to the software responsive to the time duration being longer than a predetermined time duration regardless of whether the check hash matches the access hash.

12. The secure software system of claim 10, wherein the instructions are executable on the processor to:

generate a random salt, wherein the specifying of the selected data string comprises specifying insertion of the random salt in the selected data string.

13. The secure software system of claim 10, wherein the software comprises a virtual machine or a software container.

14. A non-transitory computer-readable storage medium comprising instructions that upon execution cause a trusted computing system to:

maintain, in the trusted computing system, a copy of at least portions of data of software in an untrusted computing system;

specify data from data included in the copy as hash data;

generate an executable file for generating a hash based on the hash data;

send, over a network, the executable file from the trusted computing system to the software in the untrusted computing system;

execute the executable file in the trusted computing system to generate a check hash using the hash data from the copy; and determine whether the software is valid based, at least in part, on a comparison of the check hash to an access hash generated by execution of the executable file by the software in the untrusted computing system using the specified data from the untrusted computing system as the hash data, and based on a time duration taken by the software in the untrusted computing system to generate the access hash.

15. The non-transitory computer-readable storage medium of claim 14, wherein the instructions upon execution cause the trusted computing system to:

deem the software as valid if the check hash matches the access hash and the time duration does not exceed a specified duration;

provide a key to the software in the untrusted computing system for decrypting encrypted data responsive to the software being deemed valid; and deny provision of the key to the software in the untrusted computing system responsive to the check hash not matching the access hash or if the time duration exceeds the specified duration.

16. The method of claim 1, further comprising:
receiving, by the trusted computing system over a network from the software in the untrusted computing system, a validation request for validating the software, wherein the specifying of the selected data and the generating of the executable file are in response to the validation request.

17. The method of claim 1, wherein the generating of the executable file comprises randomly selecting a hash function from a plurality of hash functions, and including the selected hash function in the executable file, the selected hash function for generating the access hash by the execution of the executable file by the software in the untrusted computing system.

18. The method of claim 1, wherein the generating of the executable file comprises including a time stamp in the executable file, and wherein the determining of whether the software is valid is further based on determining an elapsed time between a time of the time stamp and a time at which the access hash was received from the software in the untrusted computing system.

19. The secure software system of claim 10, wherein the generating of the executable file comprises randomly selecting a hash function from a plurality of hash functions, and including the selected hash function in the executable file, the selected hash function for generating the access hash by the execution of the executable file by the software in the untrusted computing system.

20. The secure software system of claim 10, wherein the generating of the executable file comprises including a time stamp in the executable file, and wherein the providing of the key to the software is further based on determining an elapsed time between a time of the time stamp and a time at which the access hash was received from the software in the untrusted computing system.

* * * * *